United States Patent [19]
Tanabe

[11] Patent Number: 5,822,382
[45] Date of Patent: Oct. 13, 1998

[54] MULTIFRAME-STRUCTURED BIT SYNCHRONIZATION CIRCUIT FOR DATA SIGNAL

[75] Inventor: Toshiyuki Tanabe, Tokyo, Japan

[73] Assignee: NEC Corporation, Tokyo, Japan

[21] Appl. No.: 586,491

[22] Filed: Jan. 16, 1996

[30] Foreign Application Priority Data

Jan. 18, 1995 [JP] Japan ................................. 7-005440

[51] Int. Cl.$^6$ ................................................. G11B 17/22
[52] U.S. Cl. ........................ 375/357; 370/503; 370/510; 371/47.1; 371/67.1
[58] Field of Search ................................. 375/354, 357, 375/359, 368, 365, 366, 363; 370/503, 509, 510, 512, 514; 371/42, 46, 47.1, 67.1

[56] References Cited

U.S. PATENT DOCUMENTS

| | | | |
|---|---|---|---|
| 4,811,367 | 3/1989 | Tajika | 370/510 |
| 4,876,701 | 10/1989 | Sanner | 375/357 |
| 5,107,495 | 4/1992 | Kamoi et al. | 375/357 |
| 5,259,004 | 11/1993 | Nakayama | 375/357 |
| 5,363,438 | 11/1994 | Tanaka | 375/357 |

FOREIGN PATENT DOCUMENTS 5-122188  5/1993  Japan.

*Primary Examiner*—Wellington Chin
*Assistant Examiner*—Congvan Tran
*Attorney, Agent, or Firm*—Scully, Scott, Murphy & Presser

[57] ABSTRACT

The bit synchronization circuit of the present invention has an extraction circuit for extracting only bits at specified positions from each frame of a data signal comprising a plurality of frames including synchronization detection bits which are set to specified positions of each frame and whose values are different between adjacent frames. It is decided whether synchronization is established or not by a synchronization decision circuit in accordance with values of the bits extracted from adjacent frames among the extracted bits. In the case of the above decision, the bits extracted from the adjacent frames are compared each other among the extracted bits and it is decided that synchronization is established only when the above comparison results do not coincide with each other N times consecutively. Moreover, it is decided that synchronization is not established only when the comparison results do not coincide with each other N times consecutively.

4 Claims, 4 Drawing Sheets

FIG.4A, FIG.4B, FIG.4C, FIG.4D, FIG.4E, FIG.4F

MULTIFRAME-STRUCTURED BIT SYNCHRONIZATION CIRCUIT FOR DATA SIGNAL

BACKGROUND OF THE INVENTION

The present invention relates to a bit synchronization circuit, particularly to a bit synchronization circuit for establishing synchronization for a 6.312-MHz interface unit (hereafter referred to as a 6.3-M interface).

The 6.3-M interface has 16 status bit frames which are equal to the number of handling groups (HGs) and each of which operates at an independent frame phase.

A conventional bit synchronization circuit, as shown in Japanese patent Laid-open Publication No. 5-122188, uses many storage devices such as RAMs and ROMs and simultaneously monitors status frames.

Therefore, it is necessary to write complexly-combined data in a ROM and moreover, complex timing control is necessary for write or read of data in a RAM and interrupt control and address counter control of the RAM. Moreover, the control circuit of the RAM requires a large scale.

In the case of the above conventional bit synchronization circuit, synchronization establishment operation is executed on the same memory cell for each independently operating status frame. Therefore, there is a disadvantage that hardware becomes bulky as a whole because various controls including the control of pull-in state transition are complex and a lot of memory cells are mounted on a package.

Moreover, the conventional bit synchronization circuit constantly holds status bits for 8 frames and compares the status bits with the data for preceding 8 frames to create the next frame pattern. Therefore, there is a disadvantage that hardware requires a large scale because it is necessary to constantly hold many status bits.

SUMMARY OF THE INVENTION

The present invention is made to solve the above problems of the prior art and its object is to provide a bit synchronization circuit requiring less hardware.

The bit synchronization circuit of the present invention handles a signal comprising a plurality of frames respectively including synchronization detection bits set to specified positions of each frame and having different values between adjacent frames. Only bits at specified positions are extracted from each frame by an extraction circuit. Whether synchronization is established or not is decided by a synchronization decision circuit in accordance with values of bits extracted from adjacent frames among these extracted bits. In the case of this decision, the bits extracted from adjacent frames are compared among extracted bits and it is decided that synchronization is established only when the comparison results do not coincide with each other N times consecutively and synchronization is not established only when the comparison results coincide with each other N times consecutively.

The bit synchronization circuit of this embodiment disuses the control of complex memory cells by establishing synchronization every independent status frame. Moreover, the circuit decreases the size of the hardware for establishing multiframe synchronization by storing only status bits on data frames in a shift register.

BRIEF DESCRIPTION OF THE DRAWINGS

The above and other objects, features, and advantages of the present invention will become apparent from the following detailed description when taken with the accompanying drawings in which:

Figures 4A, 4B, 4C, 4D, 4E, 4F:
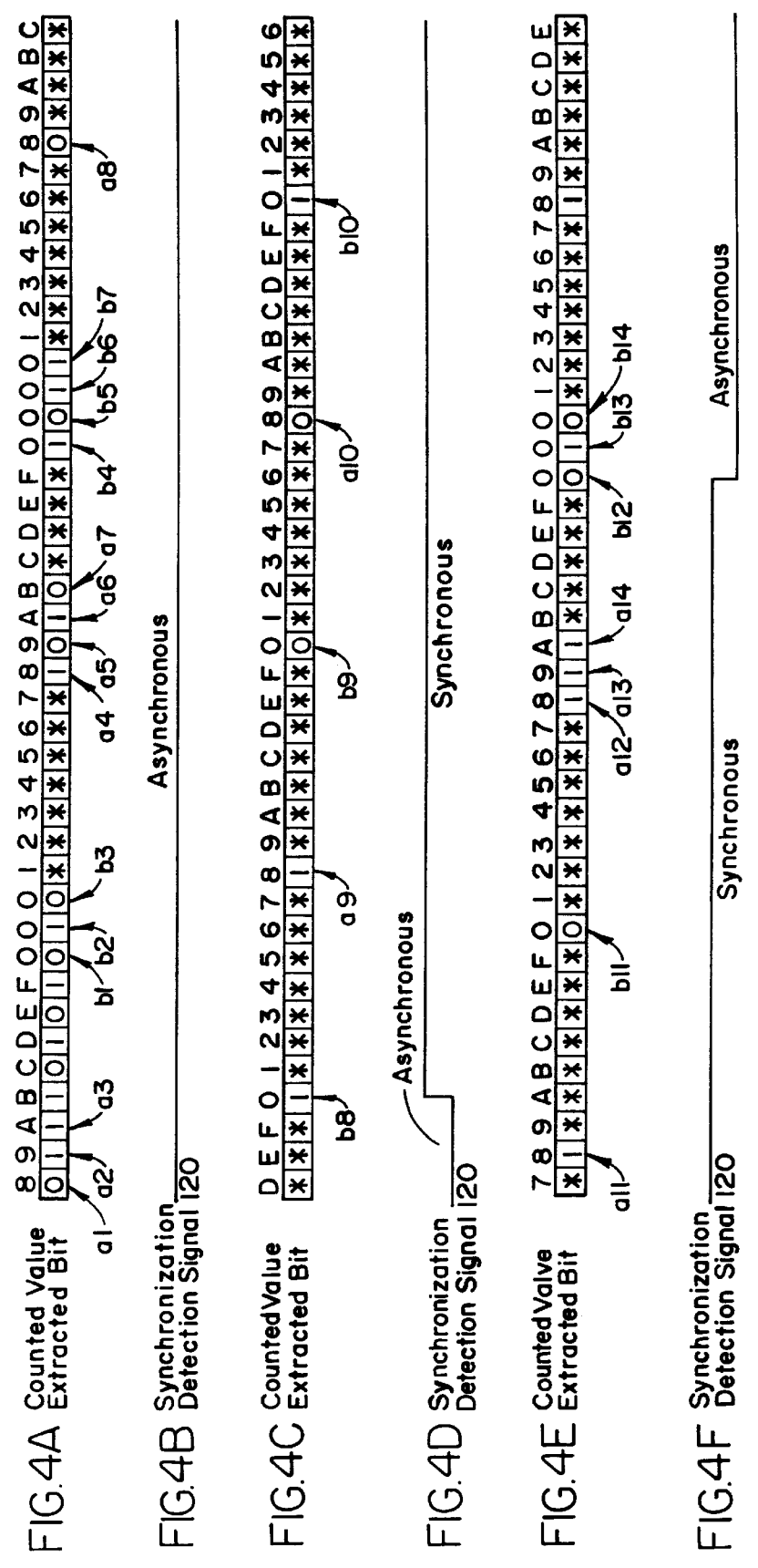

FIG. 4A–4F are a time chart showing the relation between status bit comparison results and whether synchronization is established or not.

DETAILED DESCRIPTION OF THE PREFERRED EMBODIMENT

Figure 1:
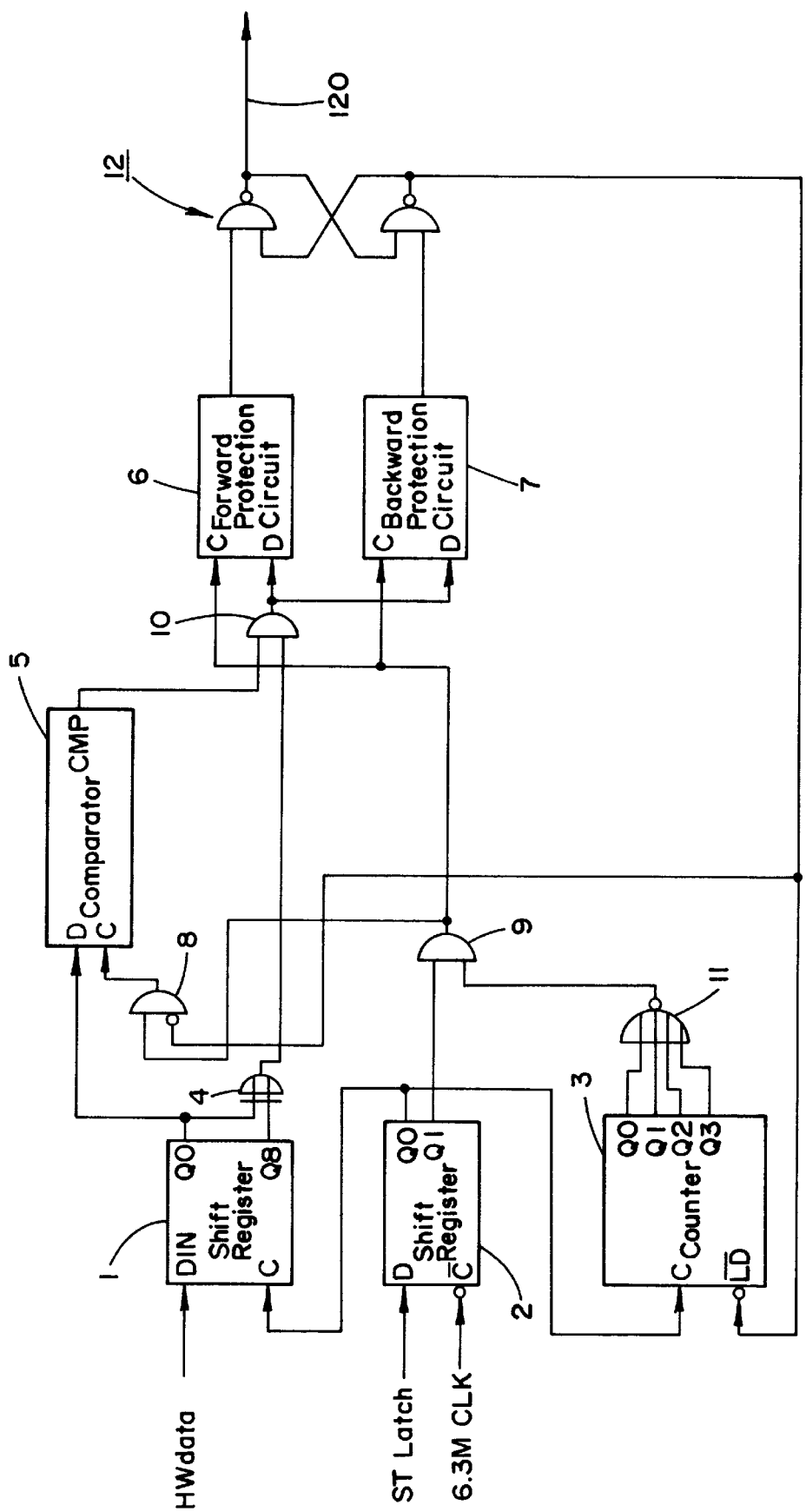
FIG. 1 is a block diagram showing the structure of the bit synchronization circuit of an embodiment of the present invention.

FIG. 1 is a block diagram showing the structure of an embodiment of the bit synchronization circuit of the present invention. This embodiment uses a status bit as a synchronization detection bit.

In FIG. 1, the bit synchronization circuit has a two-bit shift register 2 for generating a clock to separate and extract a status bit. In accordance with the clock, a nine-bit shift register 1 successively holds and shifts a highway data signal HWdata. An EX-OR 4 compares outputs Q0 and Q8 of the shift register 1.

Moreover, the bit synchronization circuit of this embodiment is provided with a status-bit previous-value comparator 5 for comparing the status bits of the present frame with the status bits of 16 frames before. The timing serving as a trigger for comparison is generated by a sixteen-bit counter 3 in this comparator 5.

A forward protection circuit 6 decides that synchronization is established when the comparison results by the comparator 5 coincide with each other two times consecutively. A backward protection circuit 7 decides that synchronization is pulled out when the comparison results by the comparator 5 do not coincide with each other two times consecutively. Outputs of the both protection circuits are held by a flip flop (F/F) 12 and a synchronization detection signal 120 is output. In FIG. 1, reference numerals 8 to 10 represent AND gates and reference numeral 11 represents a NOR gate.

The frame format of a general 6.312-Mbps data signal (hereafter referred to as a 6.3-M frame format) is described below by referring to FIG. 2.

Figure 2:
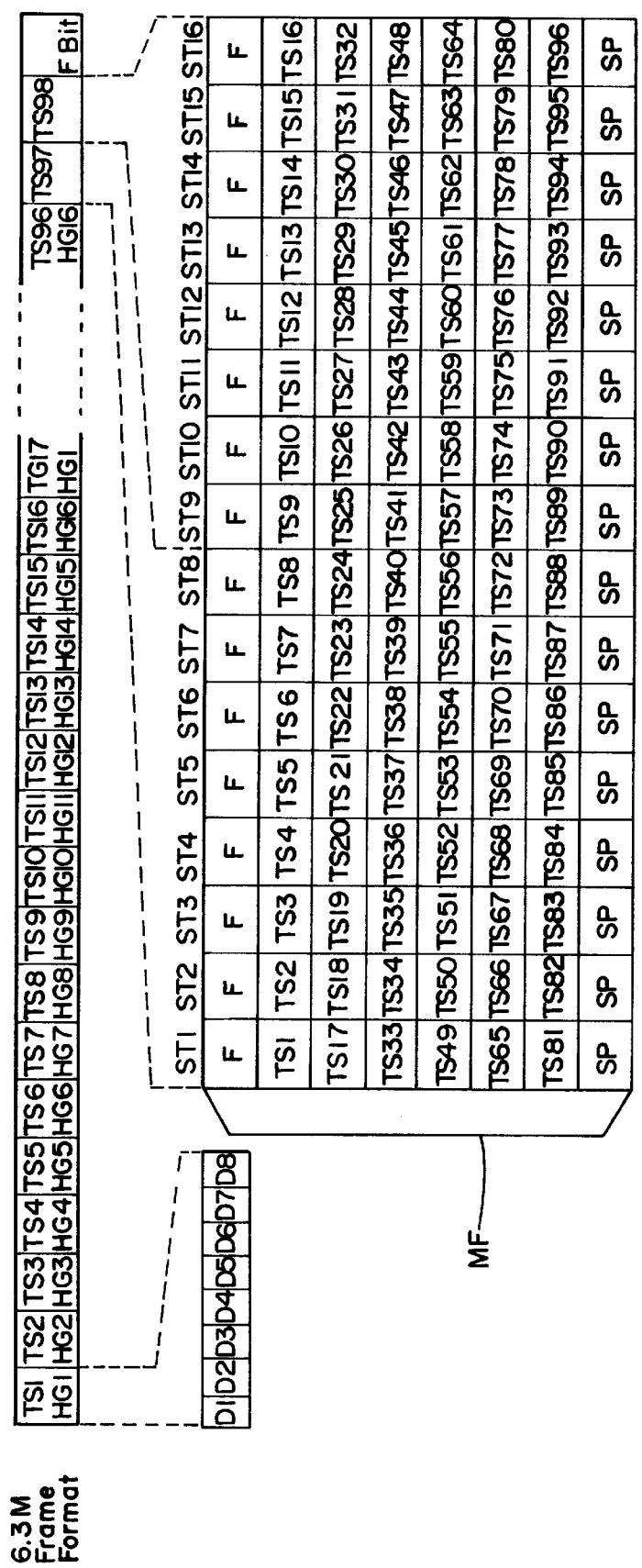
FIG. 2 is a frame format diagram showing the structure of a frame.

In FIG. 2, a 6.3-M frame is constituted by including status bits TS1 to TS96 corresponding to handing groups HG1 to HG16. Symbols D1 to D8 represent data.

Moreover, the 6.3-M frame is constituted by including status bits TS97 and TS98 and an F bit. The status bits TS97 and TS98 constitute one multiframe MF (8 frames). When showing an example by noticing the status frame ST1, a cycle of "F", "TS1", "TS17", "TS33", "TS49", "TS65", "TS81", and "SP" is repeated as shown in FIG. 2. Also in the case of the status frames ST2 to ST16, a cycle is repeated in the vertical direction of FIG. 2. Thereby, the circuit shown in FIG. 1 is required up to 16.

Symbol "F" represents a sync bit serving as ⁰⁄₁ alternate data. Symbol "SP" represents normal state when "SP" it is set to "1" and an alarm when it is set to "0".

In FIG. 1, the nine-bit shift register 1 separates and extracts only bits constituting a status bit from the 6.312-Mbps highway data signal and shifts and holds them every 125 μs or every frame.

The two-bit shift register 2 latches a signal at the trailing edge of a 6.312-MHz clock every 125 μs or every frame to generate a 6.312-MHz inversion signal. The inversion signal is used as a clock for separating and extracting status bits from the shift register 1.

To synchronize status bits, it is necessary to perform synchronization processing with status bits captured by the nine-bit shift register 1. The outputs Q0 and Q8 of the register 1 are input to the EX-OR gate 4 to detect a 0/1 alternate data pattern in a status frame. That is, extracted bits are compared each other in accordance with the exclusive OR in the EX-OR 4 every millisecond (8 frames). Thus, the output of the EX-OR 4 is set to "1" when the comparison results do not coincide with each other and to "0" when they coincide with each other.

The counter 3 generates the timing serving as a trigger for comparison of status bits at the time of status bit pull-in. In the case of the counter 3, the counted value is always set to "0" because the output of the F/F 12 is input to a load terminal LD at the time of status bit pull-out.

Status bits are compared each other every frame. When status bit synchronization is established, the counter 3 counts up values from "0" to "15" and skips 8 frames to compare status bits each other.

The status-bit previous-value comparator 5 compares the status bits of the present frame with those of 16 frames before by the NOR gate 11 and the AND gates 8 and 9 at the time of pull-in.

The AND gate 10 calculates the logical product between output results of the EX-OR 4 and the status-bit previous-value comparator 5. When status bits are a 0/1 alternate data pattern and the status bits of 8 frames before coincide with each other, the circuit 10 regards this as one stage of pull-in and supplies the result to the forward protection circuit 6.

That is, when status bits are "010101 . . . " or "101010 . . . ", they are the 0/1 alternate pattern and regarded as one stage of pull-in.

When the forward protection circuit 6 detects the 0/1 alternate pattern two time consecutively while synchronization is pulled out, it decides the case as pull-in. When the backward protection circuit 7 detects a pull-out pattern two times consecutively while synchronization is established, it decides the case as pull-out.

Figure 3:
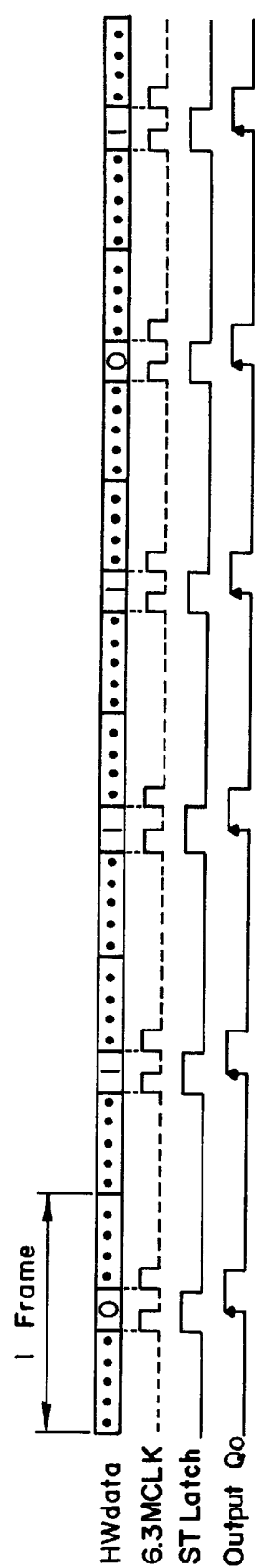
FIG. 3 is a time chart showing the operation of each section of the bit synchronization circuit in FIG. 1.

Operations of the bit synchronization circuit of this embodiment having the above structure are described below by referring to the time chart in FIG. 3. A highway data signal HWdata, a 6.312-MHz clock 6.3 MCLK, a latch signal STLatch, and an output Q0 of the two-bit shift register 2 are shown in FIG. 3. In this case, it is assumed that one frame of the highway data corresponds to 789 bits.

The latch signal STLatch is input from an external unit and becomes high-level at the bit position corresponding to the status bit in each frame of the highway data signal HWdata. The latch signal is input to the two-bit shift register 2 together with the clock 6.3 MCLK.

When the clock 6.3 MCLK falls while the latch signal input to the shift register 2 is high-level, the output Q0 of the shift register 2 rises at the fall timing of the clock 6.3 MCLK. Then, the output Q0 is input to the shift register 1. Therefore, data at the pit position corresponding to the status bit in each frame is successively input to the shift register 1. Thereby, values "0", "1", "1", "1", "0", and "1" in highway data are sequentially input to the shift register 1. Then, because the outputs Q0 and Q8 among the outputs Q0 to Q8 of nine bits of the shift register 1 are input to the EX-OR 4, the status bits of the present frame are compared with those 8 frames before in the EX-OR 4.

Synchronization establishment operation is described below by referring to FIGS. 4A–4F.

FIGS. 4A–4F shows counted values (hexadecimal values of "0" to "F") of the counter circuit 3, extracted status bits, and a synchronization detection signal 120 indicating a decision result of whether synchronization is established or not. Symbol "*" in a status bit represents either "1" or "0".

When noticing data values a1 and b1, they are set to "0 0" but they are not 0/1 alternate data. Therefore, in this case, it is decided that synchronization is not established and the synchronization detection signal 120 is kept at asynchronous state.

When noticing data values a2 and b2, they are set to "1 1". Also in this case, they are not 0/1 alternate data. Therefore, also in this case, it is decided that synchronization is not established.

Moreover, when noticing data values a3 and b3, they are set to "1 0" and thus, they can be regarded as 0/1 alternate data. However, because this embodiment is provided with a forward protection circuit, the above case is not decides as synchronization establishment but it is regarded as one stage of pull-in. Therefore, if the next data values are set to "1 0", it is decided that synchronization is established. However, when noticing data values a4 and b4, they are set to "1 1". Therefore, this case is regarded as zero stage of pull-in and it is decided that synchronization is not established.

Moreover, when noticing data values a5 and b5, they are set to "0 0". Therefore, it is decided that synchronization is not established. When noticing data values a6 and b6, they are set to "1 1". Therefore, it is decided that synchronization is not established.

Furthermore, when noticing data values a7 and b7, they are set to "0 1", and data values a8 and b8 are also set to "0 1". Therefore, because 0/1 alternate data appears two times consecutively, it is decided that synchronization is established and the synchronization detection signal 120 changes from asynchronous state to synchronous state.

Thereafter, because data a9 and b9 which should be set to "01" are set to "10", it is considered that synchronization is not established. However, because this embodiment is provided with a backward protection circuit, the above case is regarded as one stage of pull-out. Therefore, unless the next data values are set to "0 1", it is decided that synchronization is not established. However, when noticing data values a10 and b10, they are set to "0 1". Therefore, this case is regarded as zero stage of pull-out and it is decided that synchronization is established.

Moreover, when noticing data values a11 and b11, they are set to "1 0", and data values a12 and b12 are also set to "1 0". Therefore, this case is regarded as pull-out, it is decided that synchronization is not established, and the synchronization detection signal 120 changes from synchronous state to asynchronous state.

Furthermore, when noticing data value a13 and b13, they are set to "1 1" and thus, it is decided that synchronization is not established. When noticing data values a14 and b14, they are set to "1 0" and therefor, this case is regarded as one stage of pull-in. Therefore, if the next data values are set to "1 0", it is decided that synchronization is established.

In the above operations, the counted value of the counter 3 is kept at "0" at the time of pull-out as described above.

Hereafter similarly, it is decided whether synchronization is established or not while forward protection and backward protection are performed. The forward protection and backward protection prevent decision results from fluttering.

In the case of this embodiment, a decision result is determined by protection of two stages both for forward protection and backward protection, that is, when the forward protection and backward protection continue twice respectively. However, it is a matter of course that protection of more stages can be used or the number of stages of forward protection can be different from that of backward protection.

Moreover, it is a matter of course that the present invention can be applied to interfaces other than the 6.3M interface.

Furthermore, it is possible to use synchronization detection bits other than status bits so as to detect them.

What is claimed is:

1. A bit synchronization circuit comprising: extraction means for extracting only bits at specified positions from each frame of data consisting of a plurality of frames respectively including synchronization detection bits which are set at specified positions of each frame and whose values are different between adjacent frames, said plurality of frames including a plurality of independent status frames; and multiframe synchronization decision means for deciding whether synchronization is established or not every independent status frame in accordance with values of the bits extracted from adjacent frames among extracted bits.

2. The bit synchronization circuit according to claim 1, wherein said synchronization decision means includes comparison means for comparing the bits extracted from adjacent frames among the bits extracted from said extraction means and decides that synchronization is established only when comparison results by the comparison means do not coincide with each other N times (N is a positive integer) consecutively.

3. The bit synchronization circuit according to claim 2, wherein said synchronization decision means decides that synchronization is not established only when said comparison results do not coincide with each other M times (M is a positive integer) consecutively.

4. The bit synchronization circuit according to any one of claims 1 to 3, wherein said synchronization detection bits are status bits.

* * * * *